(No Model.)

L. DIETRICH.
TWO-PART HORSESHOE.

No. 600,517. Patented Mar. 15, 1898.

Witnesses:

Inventor:
Ludwig Dietrich
By Dyrenforth & Dyrenforth
Attys.

UNITED STATES PATENT OFFICE.

LUDWIG DIETRICH, OF CHICAGO, ILLINOIS, ASSIGNOR TO BENJAMIN HYDE, OF SAME PLACE.

TWO-PART HORSESHOE.

SPECIFICATION forming part of Letters Patent No. 600,517, dated March 15, 1898.

Application filed May 10, 1897. Serial No. 635,885. (No model.)

*To all whom it may concern:*

Be it known that I, LUDWIG DIETRICH, a citizen of the United States, residing at Chicago, in the county of Cook and State of Illinois, have invented a new and useful Improvement in Horseshoes, of which the following is a specification.

My invention relates to an improvement in the class of two-part horseshoes of which one part is nailed to a hoof of the animal and the other part is separably attachable to the fixed part to adapt it to be readily changed, as for substituting a rough-shod shoe for one that is smooth.

More particularly my present invention relates to an improvement upon the horseshoe in the class referred to set forth in Letters Patent of the United States No. 501,562, granted to me on the 18th day of July, 1893; and my object is to provide novel and peculiarly efficacious means of simple construction for connecting the two parts of the horseshoe together and for facilitating the separation of the removable part from that fastened on the animal's hoof to permit the change from one kind of shoe to another to be made expeditiously.

Figure 1:
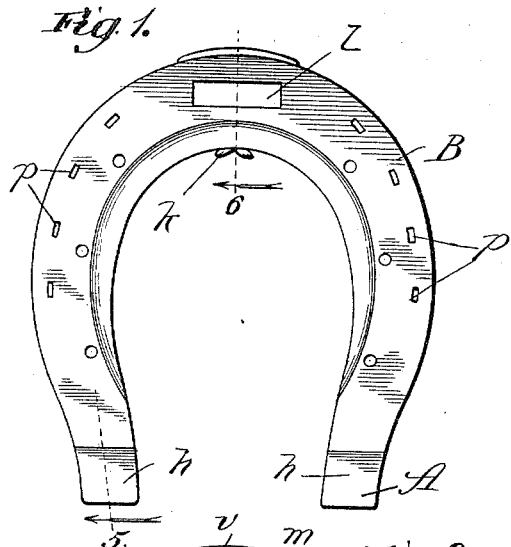
Figure 2:
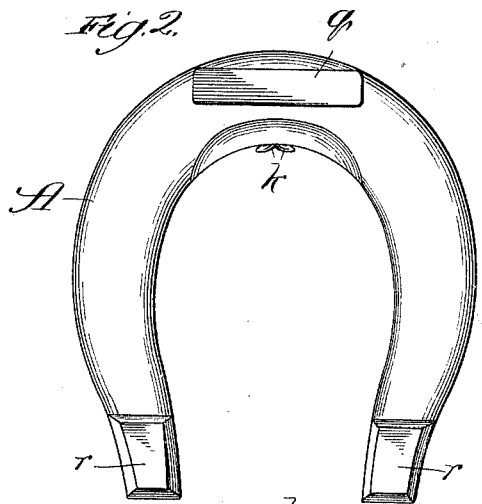
Figure 3:
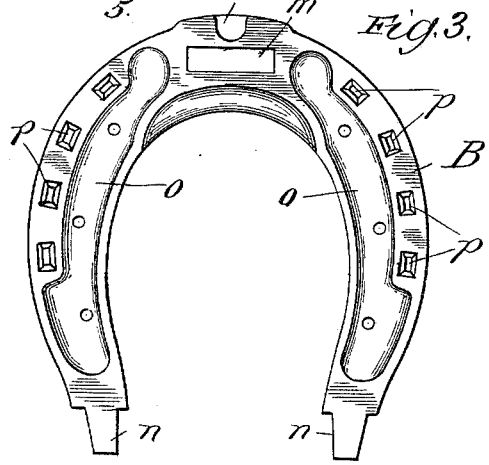
Figure 4:
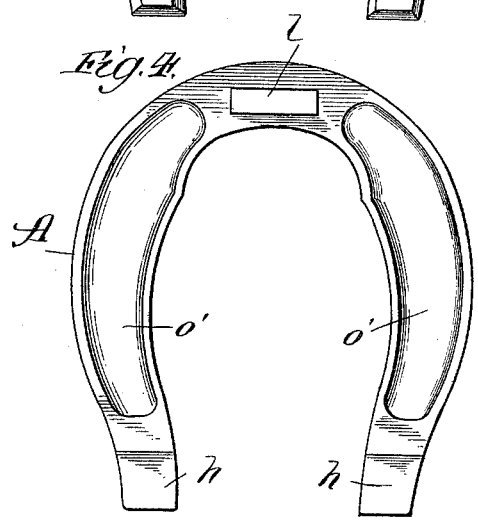
Figure 5:
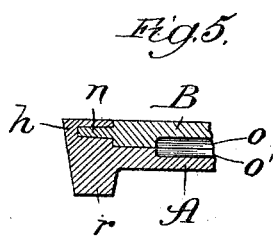
Figure 7:
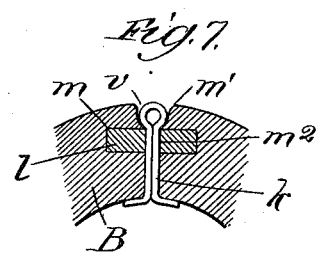
Figure 6:
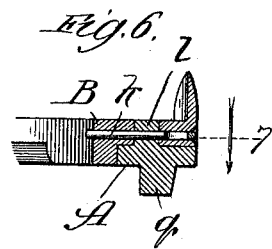

In the accompanying drawings, Figure 1 is a top plan view of my improved horseshoe; Fig. 2, a bottom plan view of the same; Fig. 3, a bottom plan view of the upper member, or that which is nailed to the hoof; Fig. 4, a top plan view of the lower or removable member; Fig. 5, a section taken at the line 5 on Fig. 1 and viewed in the direction of the arrow; Fig. 6, a section taken at the line 6 on Fig. 1 and viewed in the direction of the arrow, and Fig. 7 a section taken at the line 7 on Fig. 6 and viewed in the direction of the arrow.

The horseshoe consists of the two members A and B, the former being the removable or interchangeable member, of the general shape of a horseshoe, provided with the usual heel and toe calks $r$ and $q$, which may be either blunt or sharp, according to the use to which the shoe is to be put, or omitted altogether.

The member B is that to be secured to the hoof and is to that end provided with nail-holes $p$ and a flat upper surface. The lower surface of the member B may be smooth or grooved, as shown at $o$, for a purpose hereinafter described, and the ends or heel portions of this member terminate in keys $n\ n$, shown as wedge-shaped extensions, though they may be of other shape. In the toe portion of the member B is provided, to extend through it, an opening $m$, transversely of which there extends a pin-opening $m'$, for a purpose hereinafter described, and which should have a countersink at its outer end, as shown at $v$.

The upper face of the member A conforms to the lower face of the member B to adapt the two to lie flatwise against each other, and it may be grooved, as shown at $o'$, to form with the grooved portion $o$ of the upper member chambers for confining cushion material for the comfort of the animal in wearing the shoe. At the toe portion of the member A, on its upper side, is provided a lug $l$, and on the corresponding side at the heel portions of this lower member are provided sockets $h\ h$, closed at their sides and rear ends and at top and bottom and open at their forward ends, at which to admit the keys $n$ when the lower member is applied to the upper member, as hereinafter described.

To use my improved horseshoe the member B is nailed to the animal's hoof in the usual or any suitable manner. A rough-shod or a smooth member A is secured to the nailed member by applying the sockets $h$ to the keys $n$ in a manner to introduce the keys into the sockets, whereby the lug $l$ is brought coincident with the opening $m$, through which it is forced by pressure against the applied member. The lug contains a transverse opening $m^2$ to coincide with the opening $m'$, and the members may be fastened together when adjusted as described by passing a suitable pin, such as the cotter-pin $k$ illustrated, through the openings $m'$ and $m^2$, the head of the pin being countersunk in the outer end of the opening to prevent its protrusion.

To substitute for a member A another, it is only necessary to withdraw the pin $k$, then prize off the lower member at its toe portion, when the sockets $h$ may be readily slipped off the keys $n$ of the member B, and there-upon the member to be substituted may be easily applied in the manner already described.

In some uses of my improved horseshoe a sufficiently-secure fastening may be afforded of the removable member to the fixed member by affording an adequately-tight fit of the lug $l$ in the opening $m$, and then the openings $m'$ $m^2$ and a fastening-pin may be dispensed with. Moreover, other means than those described may be employed for the fastening purpose without departure from my invention.

What I claim as new, and desire to secure by Letters Patent, is—

1. A horseshoe comprising in combination a member B adapted to be fastened to the animal's hoof and provided at its heel portions with keys $n$ of less vertical and transverse dimensions than said heel portions, and a member A provided at its heels with raised extensions having sockets open at the front alone and adapted to receive the said keys and lock the members together with the upper side of the member B flush with the extensions, substantially as described.

2. A horseshoe comprising in combination a member B adapted to be fastened to the animal's hoof and provided at its toe portion with an opening $m$, and its heel portions with keys $n$ of less vertical and transverse dimensions than said heel portions, a member A provided at its toe portion with a lug $l$ to enter the opening $m$ in the member B, and at its heel portions with raised extensions having sockets open at the front alone and adapted to receive said keys as described, and a pin adapted to be passed through openings in the toe portion of the member B and through the lug $l$, substantially as set forth.

LUDWIG DIETRICH.

In presence of—
J. H. LEE,
R. T. SPENCER.